United States Patent [19]
Nishiyama et al.

[11] Patent Number: 5,986,859
[45] Date of Patent: *Nov. 16, 1999

[54] TAPE CARTRIDGE

[75] Inventors: Tousaku Nishiyama, Katano; Masaru Watanabe, Nishinomiya; Tumoru Ohata, Kyoto, all of Japan

[73] Assignee: Ikeuchii & Sato, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/883,263

[22] Filed: Jun. 26, 1997

Related U.S. Application Data

[63] Continuation of application No. 08/385,709, Feb. 8, 1995, abandoned.

[30] Foreign Application Priority Data

Feb. 17, 1994 [JP] Japan ................................. 6-020208
Mar. 25, 1994 [JP] Japan ................................. 6-055537

[51] Int. Cl.$^6$ ................................................. G11B 23/02
[52] U.S. Cl. ........................................................... 360/132
[58] Field of Search ............................. 360/132, 85, 95, 360/93

[56] References Cited

U.S. PATENT DOCUMENTS

| | | |
|---|---|---|
| 3,125,311 | 3/1964 | Willis et al. . |
| 3,154,308 | 10/1964 | Faulkner . |
| 3,305,186 | 2/1967 | Burdorf et al. . |
| 3,601,654 | 8/1971 | Long et al. . |
| 3,692,255 | 9/1972 | Von Behren . |
| 4,257,079 | 3/1981 | Yoshizawa ........................ 360/137 |
| 4,635,155 | 1/1987 | Georgens et al. ................. 360/132 |
| 4,975,792 | 12/1990 | Renders et al. ..................... 360/85 |
| 5,081,555 | 1/1992 | Rohloff ............................ 360/132 |
| 5,374,004 | 12/1994 | Von Behren ....................... 360/60 |

FOREIGN PATENT DOCUMENTS

| | | |
|---|---|---|
| A-0 076 205 | 4/1983 | European Pat. Off. . |
| A-0 156 723 | 10/1985 | European Pat. Off. . |
| A-2 420 817 | 10/1979 | France . |
| A-25 36 385 | 2/1976 | Germany . |
| A-31 13 437 | 11/1983 | Germany . |

*Primary Examiner*—Allen T. Cao

[57] ABSTRACT

A tape cartridge having a tape wound between a pair of rotative reels and the tape can be drawn from the cartridge, an expansive belt or rotative rollers is/are contacted on the surface of parts of the tape which are wound around the reels for eliminating the air between the tape layers, for removing dust adhered on the surface of the tape. Thereby, the appearance of the tape wound the reels can be increased and the occurrence of drop-out or increase in the rate of error can be prevented.

22 Claims, 16 Drawing Sheets

TAPE CARTRIDGE

This application is a continuation of application Ser. No. 08/385,709, filed Feb. 8, 1995, now abandoned.

FIELD OF THE INVENTION

This invention relates to a tape cartridge. In particular, this invention relates to a tape cartridge containing a magnetic tape which is capable of recording and reproducing information, such as data in a central processing unit (CPU), music, screen images, etc.

BACKGROUND OF THE INVENTION

Recently, a thin tape is used in a tape cartridge of video tape and the like comprising a parallel-two-reel system for enabling long recording. However, when a thin tape having a thickness of 15 μm or less is forwarded and rewound at high speed, air layers are formed between each tape layer wound around reels. As a result, the tape slips in its widthwise direction (which is perpendicular to the tape moving direction). When the tape slips in its widthwise direction, the edges of the tape rub the bottom or ceiling of the housing of the tape cartridge, and the edges of the tape are damaged. Additionally, when the tape protrudes from the reels in its widthwise direction, the load for drawing the tape out from the tape cartridge becomes very heavy.

When dust which is created by rubbing the edges of the tape on the bottom or ceiling of the housing or which is naturally present in the air adheres on a recording face of the tape, the dust leads to recording and replaying signal failures. In particular, the tape is affected more by the adhered dust as the recording density becomes higher. Accordingly, the rate of error occurrence worsens enormously when the tape is repeatedly forwarded and rewound, and the number of drop-outs also increases.

An example of the tape cartridge containing the thin tape and used for high-density recording and reproducing is disclosed in U.S. Pat. No. 3,692,255. Another example is disclosed in U.S. Pat. No. 5,081,555.

First, the conventional tape cartridge disclosed in U.S. Pat. No. 3,692,255 is described referring to FIG. 13. This Patent relates to a tape cartridge in which reels are freely pivoted without engaging any driving mechanism and a tape is moved by a belt driving mechanism. As shown in FIG. 13, a cartridge 101 is comprised of a thin box-shaped top cover 103 made of resin and a base plate 102 made of a metal such as an aluminum plate. Top cover 103 is fixed on base plate 102 by screws. On a bottom face of base plate 102, a pair of reels 104 are freely and rotatively pivoted. A magnetic tape 105 is wound around between reels 104. Tape 105 is guided along a front face wall 103b in the inside by a pair of tape guides 106 disposed on base plate 102. Furthermore, a belt driving roller 107 is rotatively pivoted on the front side in the center of base plate 102. Also, a pair of belt guiding rollers 108 which are rotatively pivoted at both ends on the rear side of base plate 102. A belt 109 having elasticity is guided by belt driving roller 107 and both belt guiding rollers 108. Belt 109 is formed substantially in a kind of T form with strong tension of 1.6 N or higher. A part of belt 109 contacts and presses the outer circumference of both parts 105a of tape 105 which are respectively wound around both reels 104.

When tape cartridge 101 is loaded in a recording-reproducing apparatus (not shown in the figure), a door 111, which is rotatively pivoted between base plate 102 and top cover 103, is rotated in the direction shown by arrow A in the figure such that door 111 is to be in a position shown by one dotted chain line in the figure. Thus, a cutout part 110 which is formed at one end on the front side of base plate 102 and top cover 103 is opened. Subsequently, a magnetic head 112 provided on the recording-reproducing apparatus is inserted into cutout part 110, and magnetic head 112 contacts the recording face of tape 105. At the same time, a driving roller 113 provided on the recording-reproducing apparatus is inserted into an opening part 114 which formed on top cover 103, and driving roller 113 presses and rotates an outer circumference of a a part 107b having a larger diameter and integrally formed with and on top of a belt winding face 107a of belt driving roller 107. Then, belt driving roller 107 is rotatively driven by the rotation of driving roller 113, for example, in the direction shown by arrow B in the figure. Thus, belt 109 is driven in the direction shown by arrow C. Due to the movement of belt 109, the part 105a of tape 105 wound around both reels 104 are rotatively driven in the direction shown by arrow D in the figure. Accordingly, tape 105 moves in the direction shown by arrow E in the figure at a relatively high speed of 25 to 120 inch per second. At this time, recording and reproducing are performed by a magnetic head 112 onto the recording face of tape 105.

Next, the conventional tape cartridge disclosed in U.S. Pat. No. 5,081,555 is described referring to FIG. 14 and FIG. 15. This Patent relates to a compact cassette used mainly for music, and has an object of removing dust adhered on a recording face of a magnetic tape. As shown in FIG. 14 or 15, a pair of reels 204a, 204b are rotatively pivoted on a bottom face of a base member 202, and a magnetic tape 205 is wound around between both reels 204a, 204b. Tape 205 is guided by a pair of tape guides 206 disposed on base member 202 and is passed along an opening part 202a in the inside. Furthermore, a ring-shaped or substantially V-letter-shaped flexible strip 207 is provided in the center part of base member 202. Outer faces of flexible strip 207 are respectively in contact with a recording face of parts 205a, 205b of tape 205 wound around both reels 204a, 204b. Flexible strip 207 is formed, for example, of elastic materials such as polytetrafluoroethylene (PTFE). On the surfaces of flexible strip 207 contacting the recording face of tape 205, a non-woven fabric or paper and the like is formed as a cleaning layer.

In general, both of the tape cartridges 101 and 201 described above are configured such that the recording faces of tapes 105 and 205 are respectively pressed by belt 109 and flexible strip 207 while the tape moves. Therefore, it is considered as possible to wind tapes 105 and 205 on reels 104 and 204a, 204b while eliminating the air from gaps between the tape layers. In this case, even if the tape is forwarded at a relatively high speed, tape 105 or 205 does not slip out in the widthwise direction, so as to wind the tape in a stable condition. Furthermore, the dust adhered on the tape is scratched off by belt 109 or flexible strip 207, so that the rate of error occurrence or the occurrence of drop-outs can be reduced.

In order to attain a high-density recording, it is necessary to record and reproduce relatively high-frequency signals with high density. Therefore, a rotary-head system is generally used in which a tape is drawn out from a cartridge and is wound around a rotary-head drum for recording and reproducing. However, since the tape is driven by the belt in the tape cartridge according to U.S. Pat. No. 3,692,255, the friction coefficient between the tape and the belt is high, and in addition, the load due to tension of the belt is also high. As a result, when the tape cartridge 101 is used, a large drawing torque is needed to draw tape 105 out from tape cartridge 101. Thus, the problem with this type is that tape cartridge 101 can not be used for a recording-reproducing apparatus comprising a general rotary head system employed in a video taperecorder or in computer data storage. Also, especially when a thin tape (which dislikes the air layers formed between tapes) is used, when they are taken up on reels, the tape tended to lengthen or be cut off when it was attempted forcibly to draw out the tape against the load.

On the other hand, when the tape cartridge 201 according to U.S. Pat. No. 5,081,555 is used, flexible strip 207 is indeed formed of resin materials such as PTFE, but these materials do not possess the ability to expand and contract, despite being elastic. In other words, the ring-shaped flexible strip 207 does not expand in its full circumference, but remains constant. Therefore, when the tape parts which were wound around reels 204 change their diameters, flexible strip 207 slightly deforms itself responding to these changes, but the deformation is not so great as to cause expansion. As the tape travels, the diameter of the part 205a of tape 205 wound around one reel 204a becomes gradually larger, while the diameter of the other part 205b of tape 205 wound around the other reel 204b becomes smaller, so that flexible strip 207 is considered to traverse between these two reels 204a, 204b.

Since tape 205 travels at a constant speed, when the diameter of the part 205b of tape 205 wound around reel 204b is small, the curvature of the part 205b changes largely. Therefore, since flexible strip 207 can not move and deform itself responding to the changes in diameter of the parts 205a, 205b of tape 205 wound around reels 204a, 204b, it may also happen that flexible strip 207 can not contact the surface of parts 205a, 205b of tape 205 wound around reels 204a, 204b. As a result, air which is present between each tape layer of parts 205a, 205b of tape 205 can not be eliminated, so that the tape 205 slips out in the width direction, which leads to the problem that the tape can not be wound around reels 204a, 204b in a stable condition. Furthermore, the dust adhered on the recording face of tape 205 can not be scratched off, so it was difficult to reduce rate of error occurrence or drop-outs and the like.

Meanwhile, one of the performance characteristics required for a magnetic tape which is used repeatedly for recording and reproducing is a still-life. The still-life indicates durability of a tape when the tape loaded in a rotary head is reproduced while stopped for the purpose of outputting a still picture image in a video taperecorder and the like. The still-life plays a particularly important part in a broadcasting station which conducts video editorial operations, during which the still-life needs to stand for many hours. Also, in case of a domestic video taperecorder or a recording-reproducing apparatus for music use and the like, this system of pausing the moving tape in the loaded condition is used widely for improving quick access. Therefore, the still-life is also extremely important in the field of home electrical devices.

In order to improve the still-life, a lubricant such as fatty acid etc. has been applied on a magnetic layer in the past, so that the lubricity between the magnetic layer of a tape and the magnetic head improves. The more a lubricant is added, the better the lubricity of the applied film with the magnetic head. However, the strength of the applied film is greatly influenced by the amount at lubricant. If too much lubricant is added, the strength of the applied film conversely deteriorates, so that a predetermined still-life can not be secured. To prevent this kind of deterioration in the strength of the applied film from occurring, it is also possible to employ a method of applying a lubricant after forming a magnetic layer of the tape. However, the lubricant must be applied by dissolving it in an organic solvent and the like. In this case, the magnetic layer is eroded by the organic solvent, which leads to deterioration of the applied film, so that a satisfactory still-life can not be attained.

Furthermore, since the positions of reel stands in a recording-reproducing apparatus differ in each case, reels of the tape cartridge comprising a parallel-two-reel system are not fixed to the cartridge. Instead, there is enough tolerance provided to facilitate engagement of the reels with the reel stands. As a result, the reels move with great acceleration due to vibrations caused during transportation or shock etc. when cartridges are accidentally dropped, and the tape (particularly the tape that is wound around with a large volume of tape) is drawn suddenly, it causes damages to the tape. This phenomenon is especially notable for thin tapes. In addition, the vibrations during transportation etc. cause tapes to become loose which then show loading failures when loaded.

SUMMARY OF THE INVENTION

This invention solves the above-mentioned problems of the conventional tape cartridges. An object of this invention is to provide an improved tape cartridge in which a tape is wound around reels which eliminates the air between each tape layer, and the tape can smoothly be drawn out from the tape cartridge. Another object of this invention is to increase the reliability in eliminating the air between each tape layer and scratching of dust from a recording face of a tape, to prevent the occurrence of drop-out and to reduce the rate of error occurrence in recording and reproducing of information even when quick forwarding and rewinding of the tape are repeated many times.

For attaining the above and other objects and advantages, a tape cartridge of this invention comprises: a pair of reels which are rotatively pivoted on a base member; a tape which is wound between the reels and can be drawn from the front side of the base member; tape guide members which are provided on the base member for guiding a moving passage of the tape; a belt having smoothness, elasticity, expandability and contractibility, wherein the belt always contacts outer surfaces of parts of the tape respectively wound around the reels, and the belt having smoothness, elasticity, expandability and contratibility so that the belt responds to changes in diameter of the parts of the tape wound around the reels; and at least three belt guide members provided at predetermined positions on the base member for guiding the belt.

By such a configuration, the tape is wound around the reels while being pressed by the belt, so that air present between each tape layer wound around the reels can be eliminated. Thus, the parts of the tape, which are wound around the reels, will not slip or protrude in its widthwise direction perpendicular to the tape moving direction, when the moving speed of the tape is fast. As a result, the tape is wound around the reels in a stable condition. Furthermore, the tape can be wound stably in the widthwise direction, so that the edges of the tape will not be rubbed on the bottom face of the base member. Thus, the durability of the tape may not be shortened by tape damage or the like, even when a thin tape is used. Furthermore, the belt always contacts the surface (for example, a recording surface) of the tape, so that dust or particles adhered on the surface of the tape can be scratched off. As a result, the occurrence of drop-out or the rate of error occurrence can be decreased drastically. Furthermore, the belt has smoothness, elasticity, expandability and contractibility, so that the load by the belt during the tape moving can be maintained substantially constant, and the torque for drawing the tape from the tape cartridge can be decreased. As a result, since the tape cartridge can be used in a rotary-head-type taperecorder, high-frequency signals can be recorded in high density.

It is preferable that the belt has a closed-loop-shape, and at least one of the belt guide members is provided at a position in the vicinity of the center on the front side and at least two of the belt guide members are respectively provided at positions in the vicinity of both ends on the rear side of the base member. By such a configuration, the belt moves to follow the tape moving by the friction between the tape and the belt. Therefore, the torque for drawing out the tape from the tape cartridge can be made much smaller.

Alternatively, it is preferable that the belt has a closed-loop-shape, and at least two pairs of the belt guide members are respectively provided on the front side and the rear side of a space formed between the reels on the base member. By such a configuration, spaces are formed in the vicinity of both ends on the rear side of the tape cartridge, so that another mechanism such as a reel lock mechanism can be provided in the space.

Alternatively, it is preferable that the belt has a ribbon-shape, and at least one of the belt guide member is provided at a position in the vicinity of the center on the front side, and two of the belt guide members to which both ends of the belt are connected are respectively provided at positions in the vicinity of both ends on the rear side of the base member. By such a configuration, the belt can be provided in a narrow space, so that the tape cartridge can be down-sized.

Furthermore, it is preferable that at least one of the belt guide members is a roller rotatively pivoted. By such a configuration, the belt can easily and smoothly be moved to follow the movement of the tape, so that the load for driving or drawing the tape due to the friction between the tape and the belt can be decreased.

Furthermore, it is preferable that crowning is performed to make the diameter at the center of the roller larger than that at both ends of the roller. Alternatively, it is preferable that the roller has guards at both ends. By such configurations, the belt moving passage can be made stable in the widthwise direction perpendicular to the belt moving direction. As a result, the quick forwarding and rewinding of the tape can be made stable and smooth, and the tape will not slip or protrude in the direction perpendicular to the tape moving direction. The tape can be wound around the reels in a stable condition.

Furthermore, it is preferable that the tolerance of the roller in the widthwise direction of the belt is smaller than 0.5 mm. By such a configuration, the up and down vibration of the belt in the widthwise direction can be restricted in a predetermined narrow width, so that the belt moving passage can be made stable in the widthwise direction. As a result, the variation of the load of the moving or drawing of the tape can be made small, and the movement of the tape can be made stable and smooth. The tape will not slip or protrude in the direction perpendicular to the tape moving direction. The tape can be wound around the reels in a stable condition.

It is preferable that at least one of the belt guide members is a non-rotative axis fixed on the base member. By such a configuration, the belt can be provided in a small cartridge which has no room for providing the roller. In addition, the cost of the cartridge can be reduced.

Furthermore, it is preferable that the incident angle and exit angle of the belt with respect to a core of the reel, to which the tape is not scarcely wound, are substantially the same as the tangential line thereto. By such a configuration, the winding angle of the tape against the core of the reel can be minimized, so that the load for drawing the tape can be reduced.

Furthermore, it is preferable that a reel lock mechanism, which is rotatively pivoted on the base member and does not spatially interfere with the belt, is provided on the base member. By such a configuration, it is possible to prevent the careless drawing out or loosening of the tape, when the tape cartridge is not loaded on the taperecorder.

It is also preferable that each of the tape guide members is a roller rotatively pivoted on the base member. By such a configuration, the friction between the tape and the tape guide member becomes smaller, so that the load for moving or drawing out the tape can be made smaller.

In addition, it is preferable that crowning is performed to make the diameter at the center of the roller larger than that at the both ends of the roller. It is also preferable that the roller has guards at both ends. By such configurations, the tape moving passage can be made stable in the widthwise direction perpendicular to the tape moving direction. As a result, the tape will not slip or protrude in the direction perpendicular to the tape moving direction. The tape can be wound around the reels in a stable condition. Appearance of the tape wound around the reel becomes fine.

Furthermore, it is preferable that the tolerance of the roller in the widthwise direction of the tape is smaller than 0.5 mm. By such a configuration, the up and down vibration of the tape in the direction perpendicular to the tape moving direction can be restricted in a predetermined narrow width, so that the variation of the load of the moving or drawing of the tape can be made small. As a result, the moving of the tape can be made stable, and the tape will not be slip or protrude in the direction perpendicular to the tape moving direction. The tape can be wound around the reels in a stable condition. Appearance of the tape wound around the reel becomes fine.

Alternatively, it is preferable that each of the tape guide members is a non-rotative axis fixed on the base member. By such a configuration, the spaces for providing the roller for guiding the tape moving are not necessary. As a result, the tape cartridge can be down-sized, and the tape cartridge becomes inexpensive.

Furthermore, it is preferable that the belt is made of a material selected from a woven fabric, a knit fabric, and a non-woven fabric cloth. By such a configuration, the belt can easily slip on the surface of the tape, so that the tape can be wound around the reel without damaging the surface of the tape and with eliminating the air between the tape layers.

It is also preferable that lubricant is impregnated in the belt. By such a configuration, the lubricant can be transmitted to the surface of the tape, so that the still-life of the tape can be drastically increased without reducing the film strength of the tape.

Furthermore, it is preferable that the friction coefficient between the belt and the tape is smaller than 0.7. By such a configuration, the belt smoothly slips on the surface of the tape, so that the tape can be wound around the reel in a stable condition, even when the tape moving speed is fast. The still-life of the tape can also drastically be increased.

Furthermore, it is preferable that the tension of the belt is smaller than 3 N. By such a configuration, the belt can smoothly be expanded and contracted responding to the change in the diameters of the parts of the tape which are wound around the reels.

It is further preferable that the side edges of the belt are heat melted. Alternatively, it is preferable that resin is coated on a surface the belt. By such configurations, side edges of the belt are guarded and fray of the side edges can be prevented. As a result, durability of the belt is increased.

Another tape cartridge of this invention comprises: a pair of reels which are rotatively pivoted on a base member; a tape which is wound between the reels and can be drawn from the front side of the base member; tape guide members which are provided on the base member for guiding a moving passage of the tape; and a pair of pressing rollers which are respectively rotatively pivoted at ends of a pair of elastic arms, wherein the pressing rollers are always contacting outer surfaces of parts of the tape respectively wound around the reels, and the arms are provided in a space formed between the reels and are rotated responding to changes in diameter of the parts of the tape wound around the reels.

By such a configuration, the tape is wound around the reels while being pressed by the pressing rollers, so that air between the tape layers wound around the reels can be removed. Thus, the part of the tape, which is wound around the reels, will not slip or protrude in a direction perpendicular to the tape moving direction, when the moving speed of the tape is relatively fast. As a result, the tape is wound in a stable condition. Furthermore, the tape can be wound stably in the direction perpendicular to the tape moving direction, so that the edges of the tape may not be rubbed by the base member and the like. Thus, the durability of the tape may not be shortened by tape damage or the like, when the thin tape is used. Furthermore, the pressing rollers always contact the surface (for example, a recording surface) of the tape, so that the dust or particles adhered on the surface of the tape can be removed. As a result, the occurrence of the drop-out or the rate of error can be decreased drastically. Furthermore, the pressing rollers freely rotate, so that the pressing rollers will not damage the surface of the tape. The load by the pressing rollers during the tape moving can be maintained substantially constant, and the torque for drawing out the tape from the tape cartridge can be decreased. As a result, since the tape cartridge can be used in a rotary-head-type taperecorder, the high-frequency signals can be recorded in a high density.

It is also preferable that the tolerance of the pressing rollers in the direction parallel to the width of the tape is smaller than 0.5 mm. By such a configuration, the roller can freely be moved against the tape, so that the load for moving or drawing the tape can be reduced.

Furthermore, it is preferable that the edges of the pressing rollers are circularly chamfered. By such a configuration, the tape can be wound around the reels without being damaged by the pressing rollers.

It is preferable that the pressing rollers have rotation friction. By such a configuration, the pressing rollers can roll and slightly slip on the surface of the tape. Thus, the tape can be wound around the reels while removing dust adhered on the surface of the ape. As a result, the occasion of the drop-out or the rate of the error can be reduced drastically.

Alternatively, it is preferable that the pressing rollers are made of a material having adhesion. By such a configuration, the dust adhered on the surface of the tape can be removed while the pressing rollers roll on the surface of the tape. As a result, the occasion of drop-out or the rate of error can be reduced drastically.

Furthermore, it is preferable that the pressure of the pressing rollers for pressing the tape is smaller than 1 N. By such a configuration, the tape can move smoothly without a hitch by the pressure of the pressing roller.

It is also preferable that lubricant is impregnated within the pressing rollers. By such a configuration, the lubricant can be transmitted to the surface of the tape, so that the still-life of the tape can be drastically increased without reducing the film strength of the tape.

DETAILED DESCRIPTION OF THE INVENTION

First Embodiment

Figure 1:
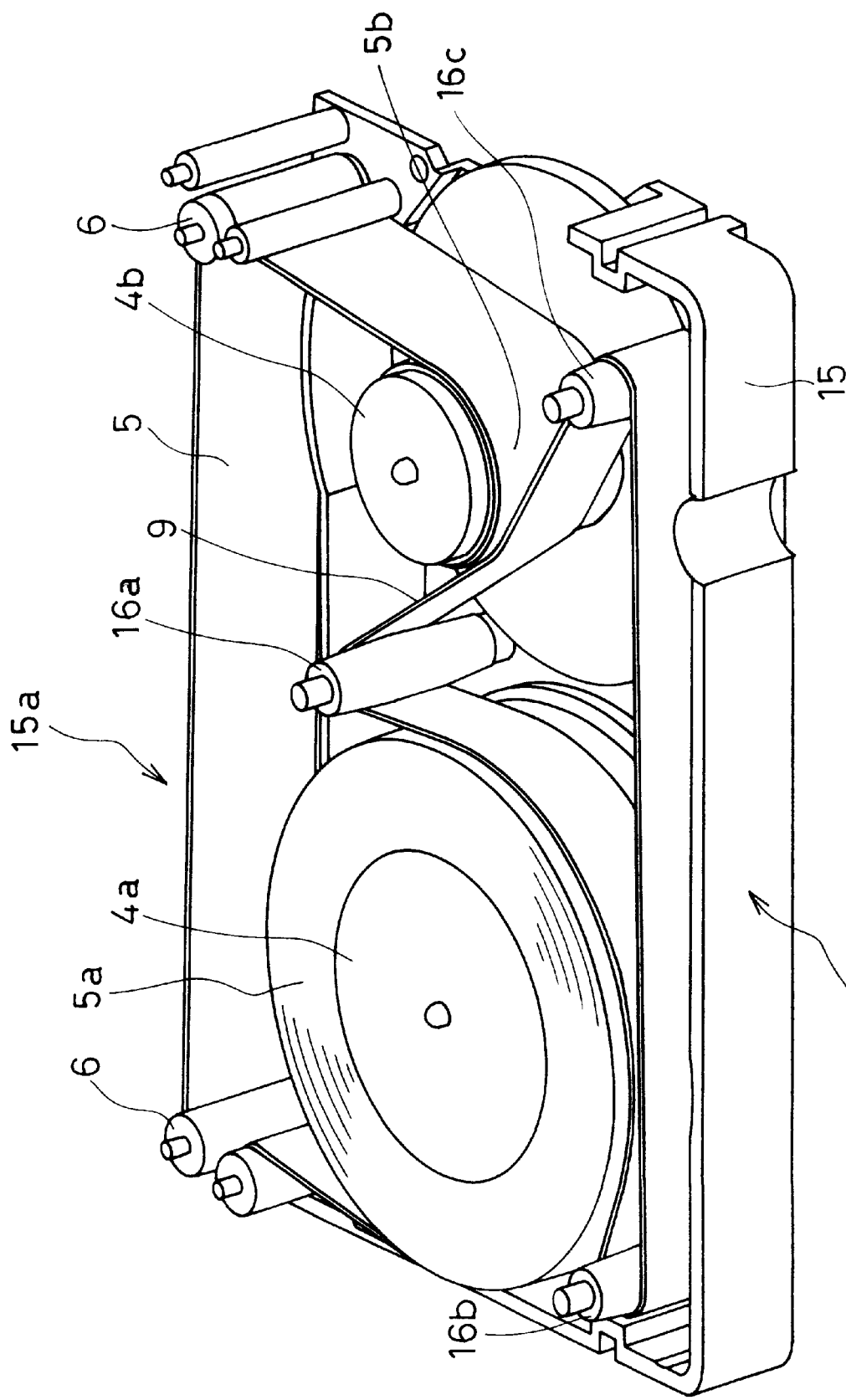
FIG. 1 is a perspective view showing a detailed configuration of a tape cartridge of a first embodiment of this invention.
Figure 2:
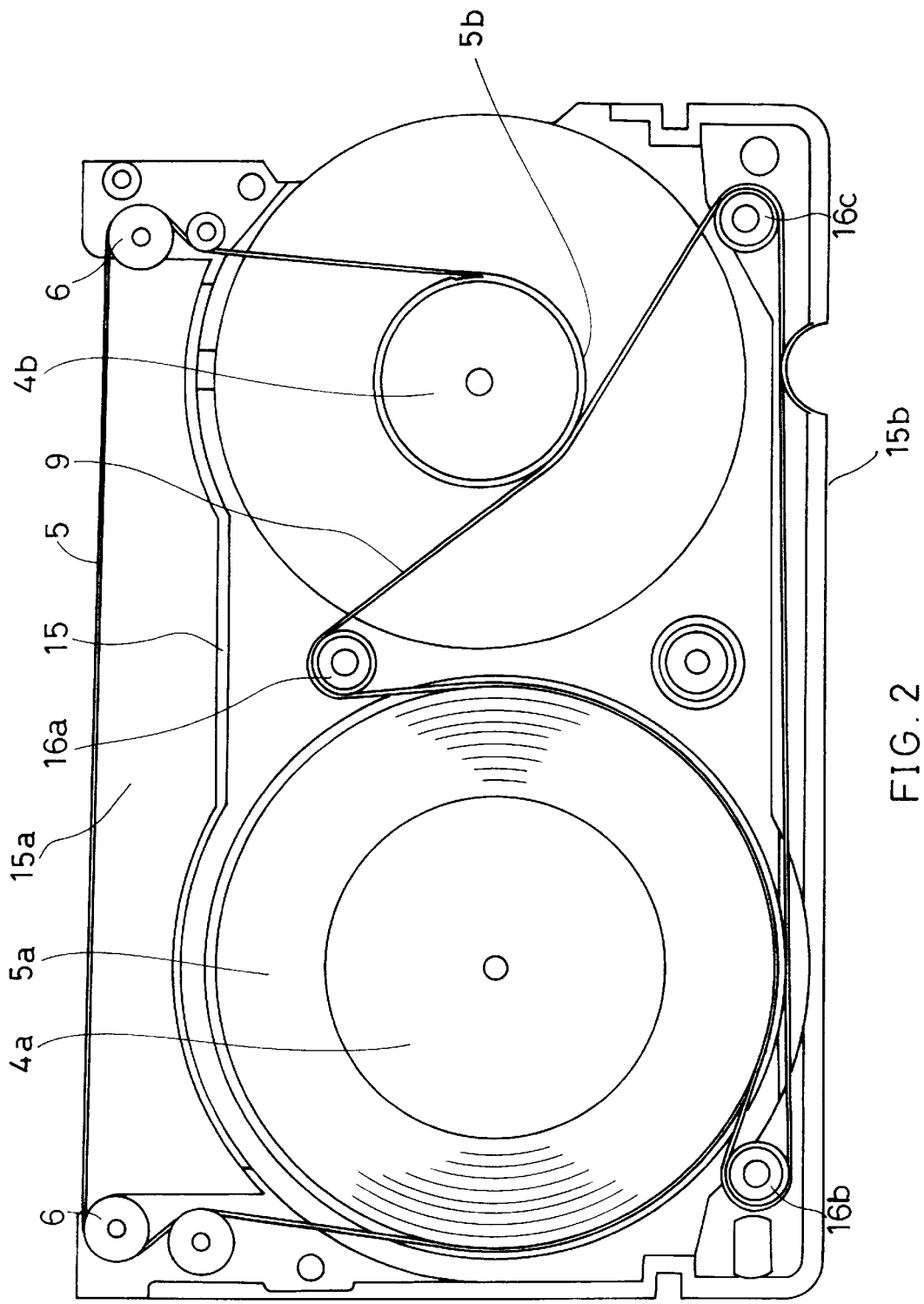
FIG. 2 is a plan view of the tape cartridge shown in FIG. 1.
Figures 3A, 3B:
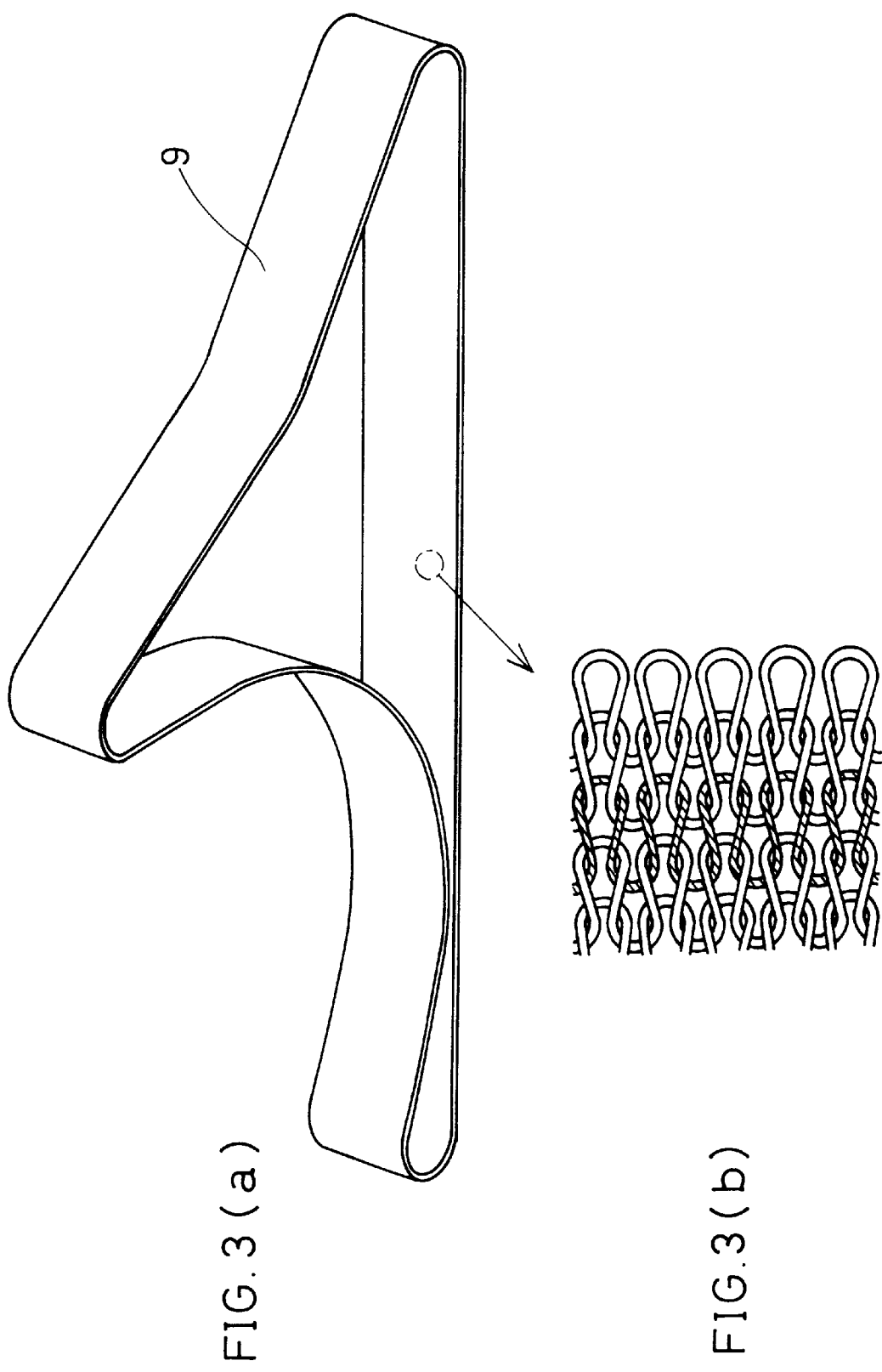
FIG. 3(a) is a perspective view for showing an appearance of a belt used in the first embodiment.
FIG. 3(b) is a plan view for showing a detailed configuration of the belt.

A first embodiment of a tape cartridge of this invention is described referring to FIGS. 1, 2, 3(a) and 3(b). FIG. 1 is a perspective view of the tape cartridge from which the top cover was removed. FIG. 2 is a plan view of the tape cartridge. In the first embodiment, a belt, which always contacts a surface of a tape, is used for eliminating the air between each tape layer of the tape wound around reels. Thereby, the appearance of parts of the tape wound around the reels can be excellent.

As shown in FIGS. 1 and 2, the tape cartridge of the first embodiment comprises: a base member 15; a pair of reels 4a, 4b rotatively pivoted on base member 15; two sets of tape guides 6 which are respectively disposed in the vicinity of both ends on the front side 15a of base member 15; three belt guide rollers 16a, 16b, 16c, one guide roller 16a is disposed in the vicinity of the center of base member 15 and other guide rollers 16b, 16c are respectively disposed in the vicinity of both ends on the rear side 15b of base member 15; and a belt 9 having a closed-loop-shape which is guided by belt guide rollers 16a, 16b, 16c. A tape 5 having thickness of, for example, 12 μmm is wound between reels 4a, 4b in a manner so that a magnetic recording face is to be the outside. Furthermore, tape 5 is guided to extend along an opening 15c on the front side 15a of base member 15 by tape guides 6. Belt 9 serves as a pressing member, and always contacts parts 5a, 5b of tape 5 which are respectively wound around reels 4a, 4b for pressing the parts 5a, 5b of tape 5 toward the center axis of reels 4a, 4b.

FIGS. 1 and 2 show the condition where almost all of tape 5 is wound around one reel 4a and tape 5 is wound only a little around the other reel 4b. At this time, belt 9 contacts the part 5b of tape 5 wound around reel 4b substantially at a line. On the other hand, belt 9 contacts the other part 5a of tape 5 wound around reel 4a substantially around ⅓ turn. While tape 5 is forwarded from reel 4a to reel 4b, the contacting area of belt 9 and the part 5b of tape 5 wound around reel 4b gradually increases, and the contacting area of belt 9 and the part 5a of tape 5 wound around reel 4a gradually decreases. Finally, the tape cartridge reaches the converse condition to the condition shown in FIGS. 1 and 2. While tape 5 is forwarded and rewound, belt 9 moves in the same direction as the tape moving direction by the friction between tape 5 and belt 9. At the same time, belt 9 expands and contracts in response to changes in diameter of parts 5a, 5b of tape 5 which are respectively wound around reels 4a, 4b. Thus, the material of belt 9 is demanded to have elasticity, expandability and contractibility. Such expandability and contractibility of belt 9 are demanded when the tape cartridge is assembled.

When the tape cartridge is loaded on a rotary-head-type recording and reproducing apparatus such as video taperecorder (not shown in the figure), tape 5 is drawn out from the tape cartridge, and is wound around a rotary head drum. When tape 5 is drawn from the tape cartridge, belt 9 slightly slips on the surface of tape 5. Thus, it is also demanded that the material of belt 9 has smoothness for enabling the slip against tape 5. Belt 9 is made of, for example, a knit fabric shown in FIG. 3(b). For enabling the slip between belt 9 and tape 5, the friction coefficient between belt 9 and tape 5 is preferably smaller than 0.7, and more preferably, to be smaller than 0.5. For satisfying these conditions, it is preferable that the fiber of the material of belt 9 is selected from polyester fiber, fluorocarbon fiber, nylon fiber, rayon fiber and carbon contained fiber, which have low friction coefficients. Alternatively, it is preferable that fluorocarbon resin or silicon resin is coated on the surface of a fiber such as polyester fiber. Furthermore, the surface electric resistance of the belt should be smaller for preventing the adhesion of tape 5 and belt 9 by static electricity. Thus, it is preferable that a material such as conductive resin is coated on the surface of the fiber. Furthermore, the side edges of belt 9 may be heat melted. Alternatively, resin may be coated the surface of belt 9. By such treatment, fray of the side edges of belt 9 can be prevented. The tension of belt 9 is preferably adjusted to be smaller than 3 N, more preferably to be smaller than 1 N for reducing the friction between tape 5 and belt 9 so that tape 5 can be drawn from the tape cartridge without damaging the effect of eliminating the air between each tape layer wound around reels 4a, 4b.

Figure 16:
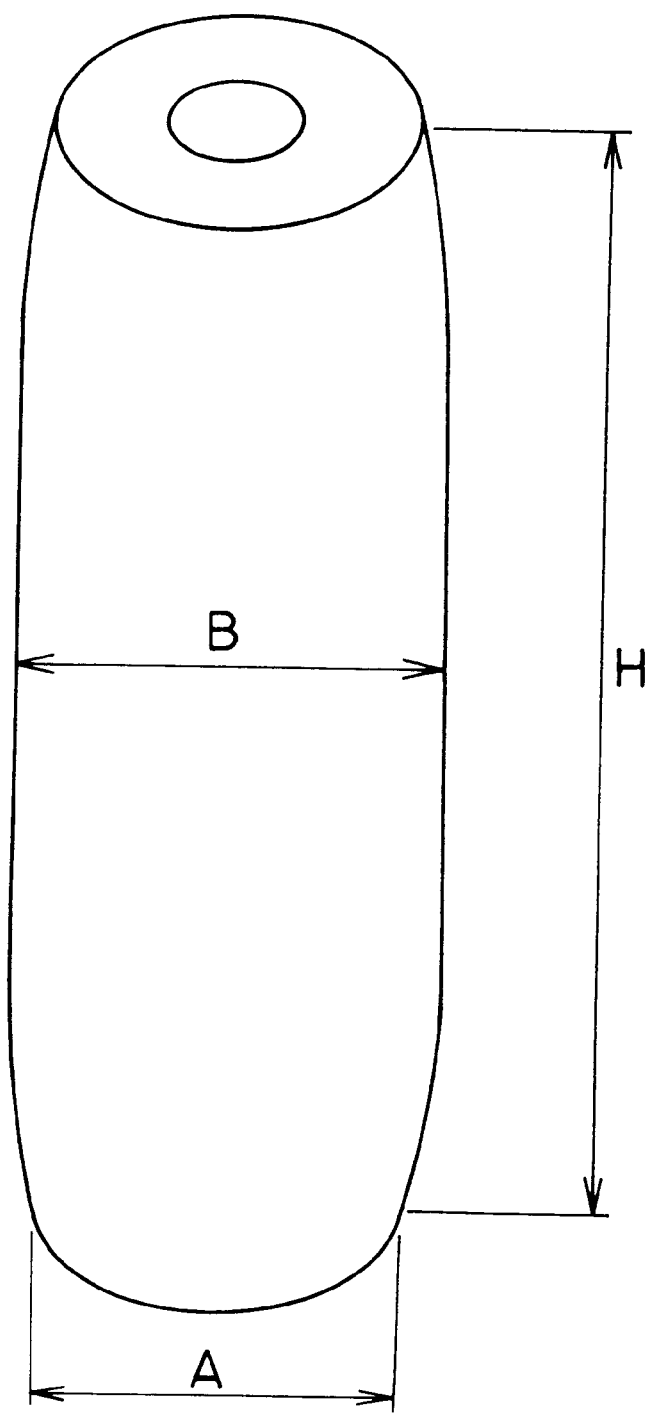
FIG. 16 is an external view of a crown roller which is used in the example of this invention.

In FIGS. 1 and 2, straight rollers having a diameter that is even at any part are, preferably used as tape guides 6. On the other hand, crowning is performed on belt guide rollers 16a, 16b, 16c for making the diameter at the center of the rollers 16a, 16b, 16c larger than that at both ends. FIG. 16 shows one example of such rollers which can be used for crown rollers. In FIG. 16, the diameter of the end part (A) is 4.8 mm, and the diameter of the central part (B) is 5.0 mm, while the height of the roller (H) is 14 mm. The reason why crowning is not performed on the tape guides 6 is that almost all of the tape moving passage is mainly defined by the tape guide rollers in the recording-reproducing apparatus to which the tape cartridge is to be loaded, and tape guides 6 do not serve for guiding the movement of tape 5 so much when the tape cartridge is loaded on the recording-reproducing apparatus. On the contrary, the belt moving passage is defined by only belt guide rollers 16a, 16b, 16c. Thus, it is preferable to perform the crowning on belt guide rollers 16a, 16b, 16c for making the movement of belt 9 smooth and stable.

The tolerance of the roller for tape guides 6 in the widthwise direction perpendicular to the tape moving direction is preferably smaller than 0.5 mm, more preferably smaller than 0.2 mm. Thereby, the up and down vibration of tape 5 in the widthwise direction can be restricted in a predetermined narrow width, so that the variation of the load for moving or drawing tape 5 can be made small. Similarly, the tolerance of belt guide rollers 16a, 16b, 16c in the widthwise direction perpendicular to the belt moving direction is smaller than 0.5 mm, more preferably smaller than 0.2 mm. Thereby, the up and down vibration of belt 9 in the widthwise direction can be restricted in a predetermined narrow width, so that the variation of the load of the tape moving by the friction between tape 5 and belt 9 can be made small.

An example of the material of belt 9 which was actually used in experiments is described.

Fibers: Polyester fiber (60 denier)
Weight: 80–90 g/m$^2$
Stitch of knit fabric: Single
Coating:
(First Coating)
  Objective: Water repellent finishing
  Resin: Mixture of fluorocarbon resin and silicon resin
(Second Coating)
  Objective: Runproof and maintaining elasticity at high temperature
  Resin: Silicon rubber resin
  Quantity of resin: 20–30 Wt % to the material
  Others: Surface active agent and carbon are added to the resin to impart an anti-static quality.

In this embodiment, the diameter of the tape reel is 40 to 45 mm. The tape is ½ inch (12.65 mm) wide and 80 m long. The length of the belt is 160 to 170 mm and the width of the belt can be selected from 4 mm, 6 mm, and 11 mm. In any case, the tape travels well.

Second Embodiment

Figure 4:
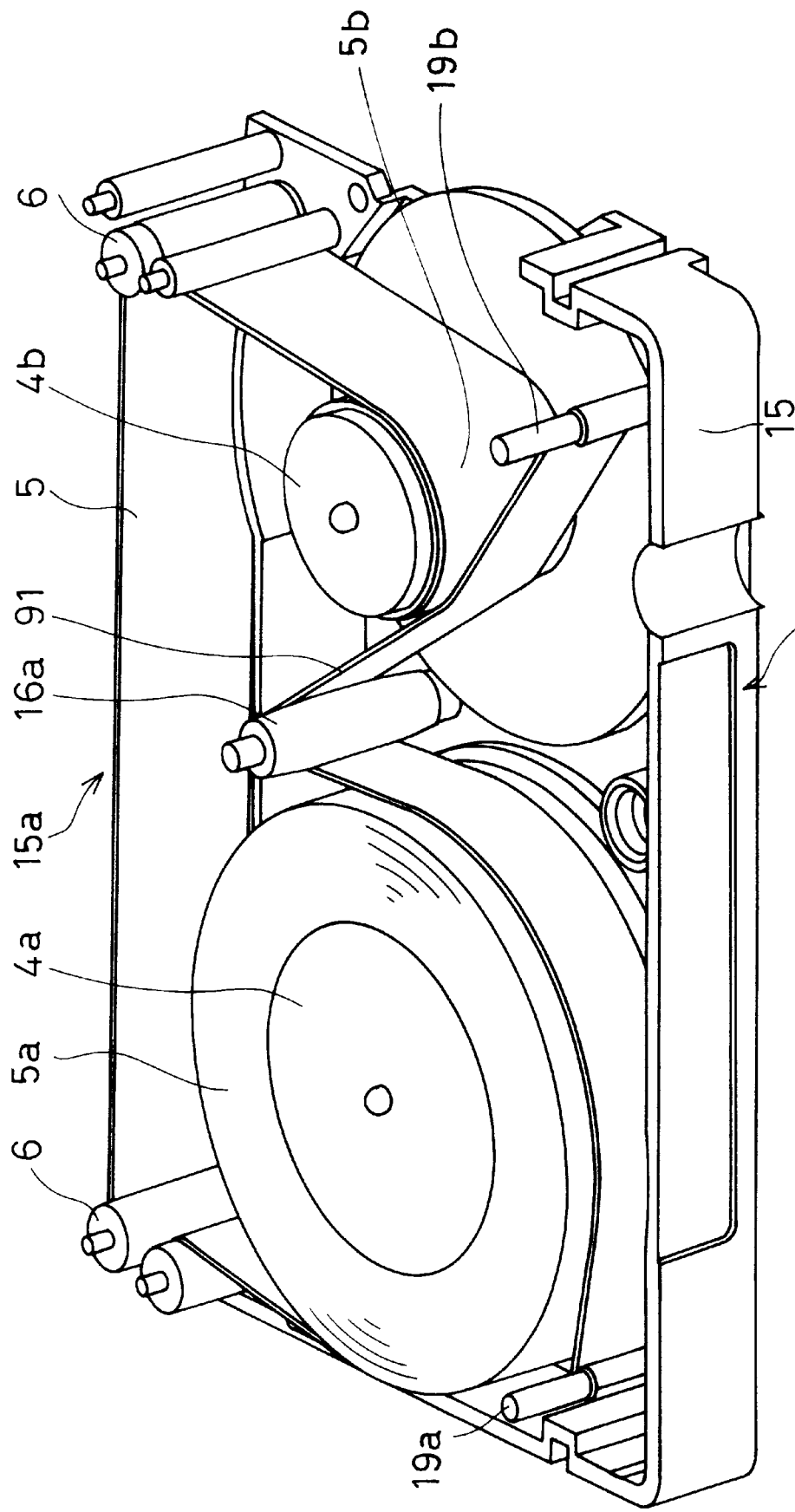
FIG. 4 is a perspective view showing a detailed configuration of a tape cartridge of a second embodiment of this invention.
Figure 5:
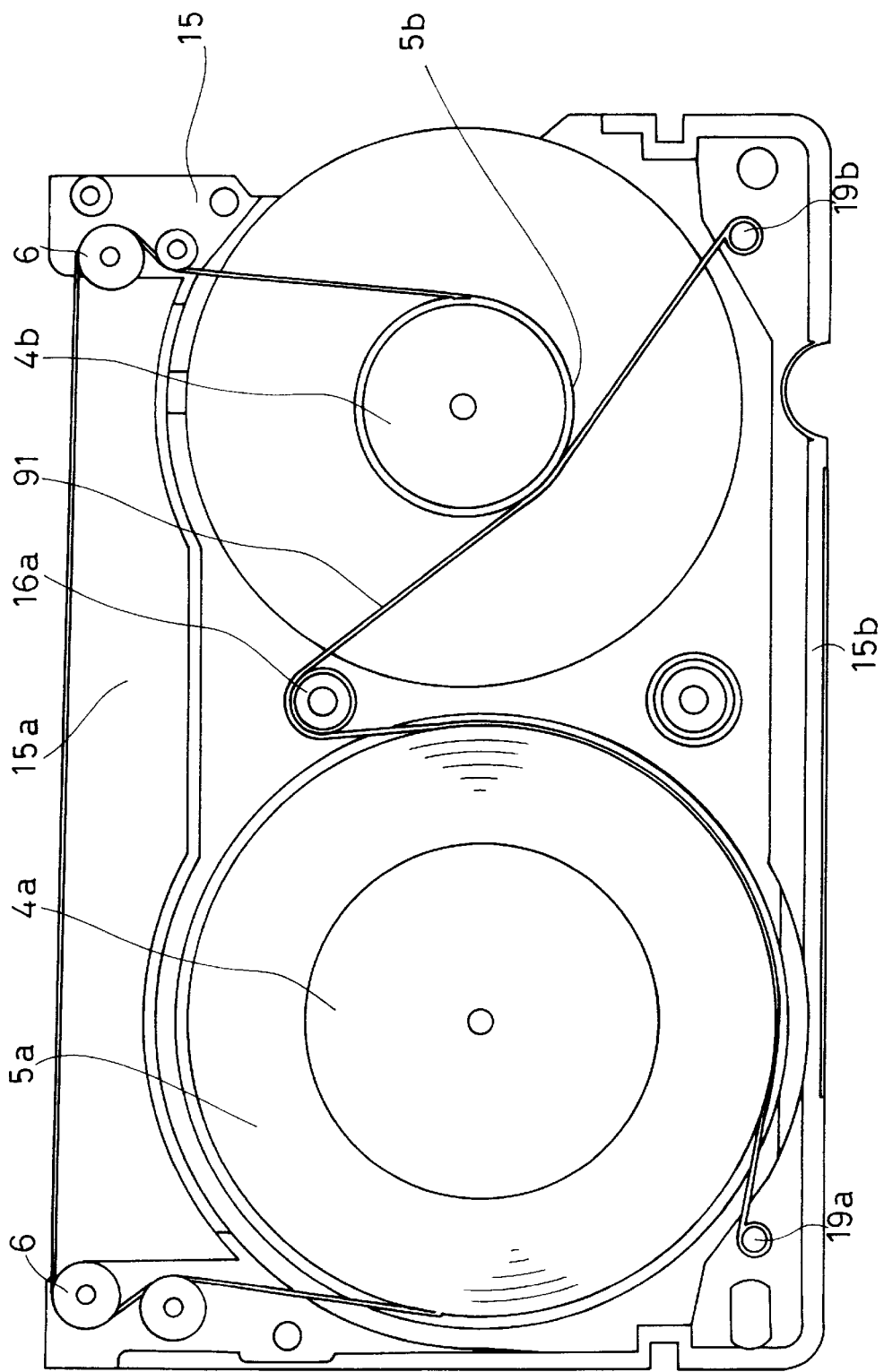
FIG. 5 is a plan view of the tape cartridge shown in FIG. 4.

A second embodiment of a tape cartridge of this invention is described referring to FIGS. 4 and 5. FIG. 4 is a perspective view of the tape cartridge from which the top cover was removed. FIG. 5 is a plan view of the tape cartridge. Elements designated by the same numerals in the above-mentioned first embodiment are substantially the same, and therefore explanation of them are omitted.

In the tape cartridge of the second embodiment shown in FIGS. 4 and 5, fixed axes 19a, 19b are provided in the vicinity of both ends on the rear side 15b of base member 15 instead of belt guide rollers 16b, 16c in the first embodiment. Both ends of a belt 91 are respectively fixed on fixed axes 19a and 19b.

In the second embodiment, a knit fabric is used as a material of belt 91 similar to the first embodiment. However, fluorocarbon resin is coated on the surface of belt 91 in a manner so as to reduce the friction coefficient between tape 5 and belt 91 for decreasing the load of the movement of tape 5. Since tape 5 moves with contacting belt 91, the tape cleaning effect of belt 91 can be increased when the material of belt 91 is selected to be one suitable for the tape cleaning. The belt guide roller 16a can freely be rotated. However, it is possible that belt guide roller 16a is non-rotative by selecting a material of belt guide roller 16a that imparts sufficient smoothness to belt 91.

Third Embodiment

Figure 6:
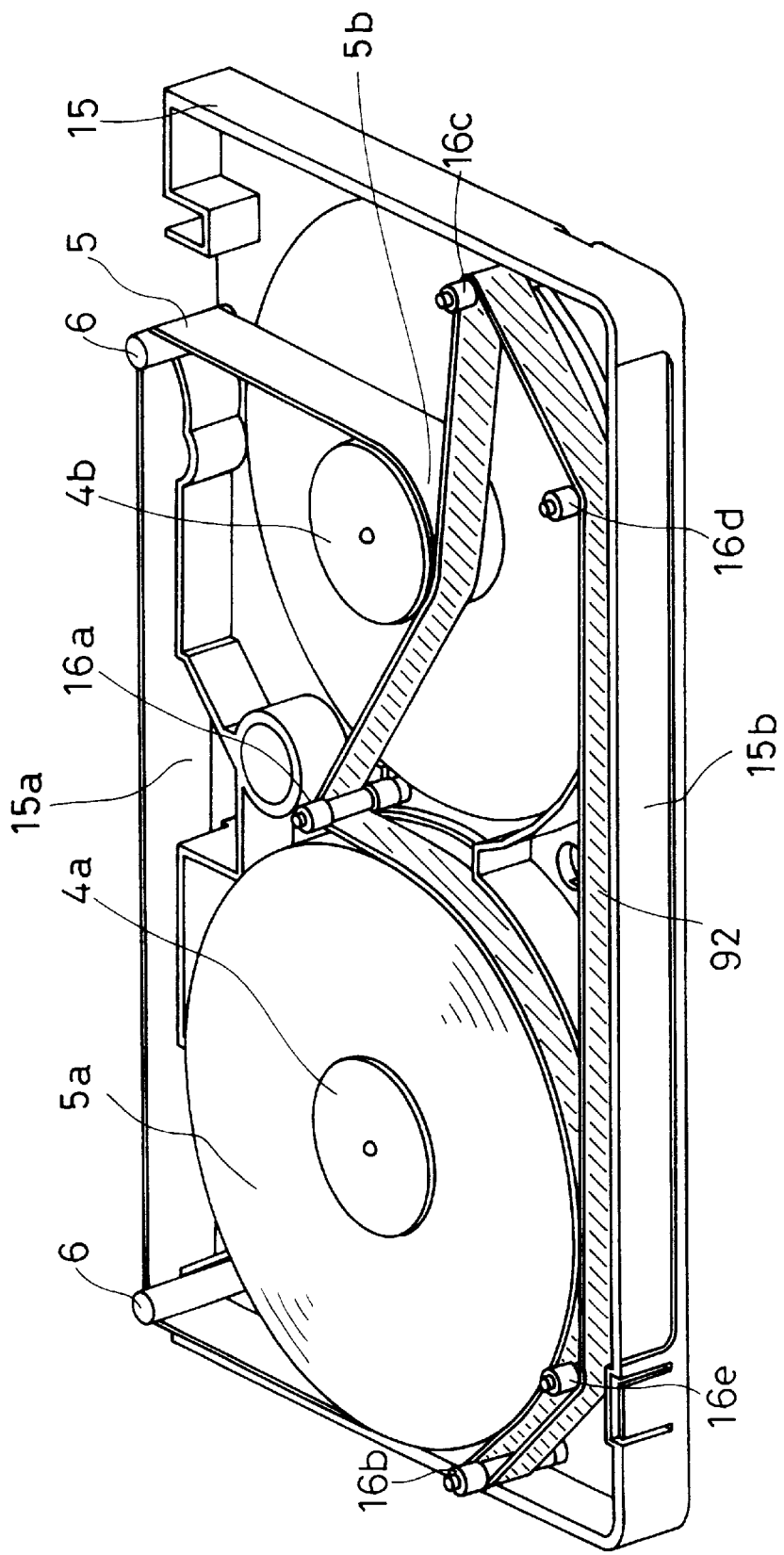
FIG. 6 is a perspective view showing a detailed configuration of a tape cartridge of a third embodiment of this invention.
Figure 7:
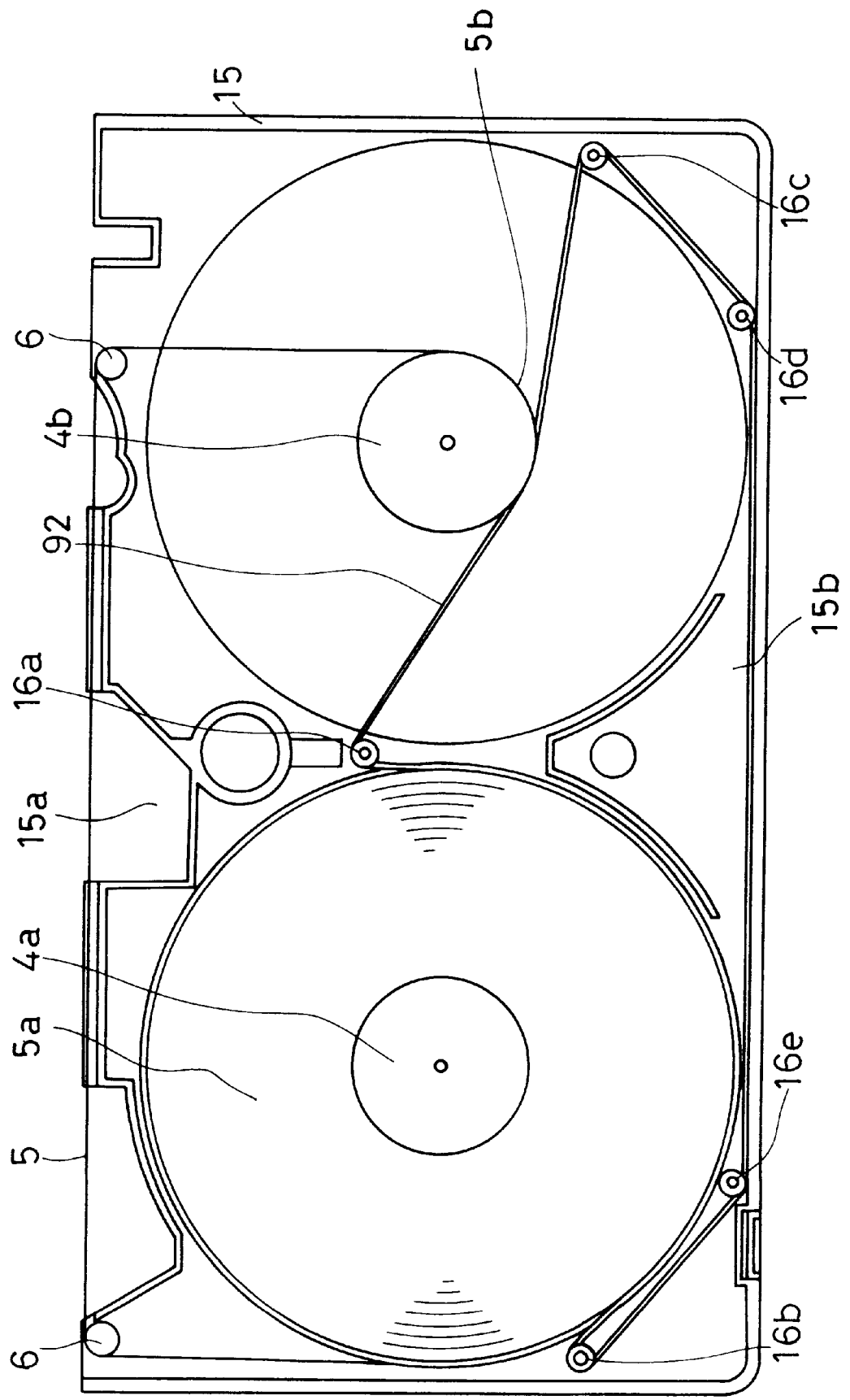
FIG. 7 is a plan view of the tape cartridge shown in FIG. 6.

A third embodiment of a tape cartridge of this invention is described referring to FIGS. 6 and 7. FIG. 6 is a perspective view of the tape cartridge from which the top cover was removed. FIG. 7 is a plan view of the tape cartridge. Elements designated by the same numerals in the above-mentioned first embodiment are substantially the same, and therefore explanation of them are omitted. The third embodiment corresponds to a tape cartridge having large reels which changes the passage of the belt.

In the third embodiment shown in FIGS. 6 and 7, not only belt guide rollers 16b and 16c but also belt guide rollers 16d and 16e are provided in the vicinity of both ends on rear side 15b of base member 15. A belt 92 is guided by these belt guide rollers 16a to 16e. Namely, when the diameter of reels 4a and 4b are larger, and belt 92 is guided by three belt guide rollers as shown in the first embodiment, inner surfaces of belt 92 will contact and belt 92 can not possibly move to follow the movement of tape 5. On the contrary, by increasing the number of the belt guide rollers, the contact of the inner surfaces of belt 92 can be prevented, and the movement of belt 92 can be secured. The belt guide rollers 16a to 16e have guides on both ends for making the passage of the movement of belt more stable.

Fourth Embodiment

Figure 8:
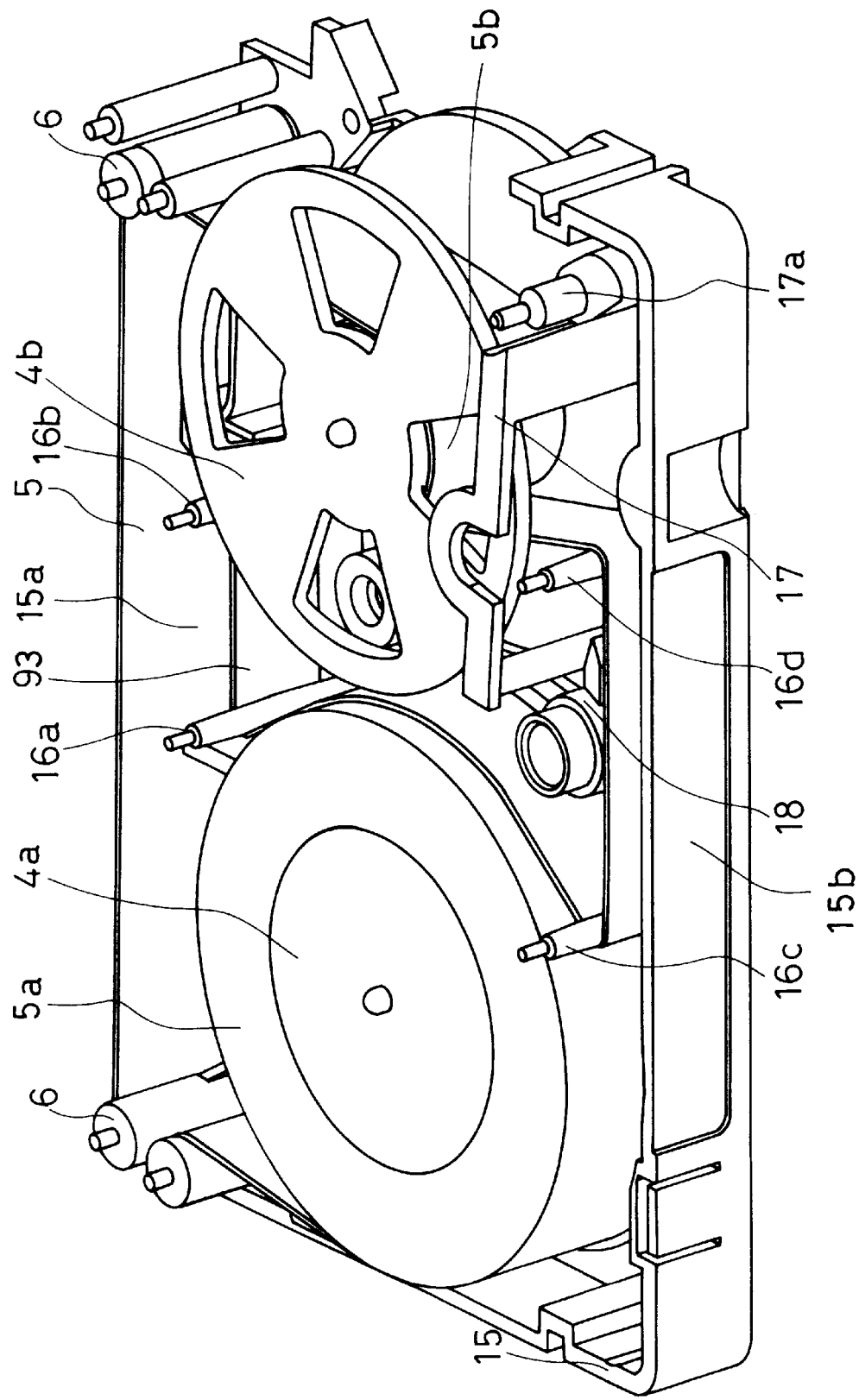
FIG. 8 is a perspective view showing a detailed configuration of a tape cartridge of a fourth embodiment of this invention.
Figure 9:
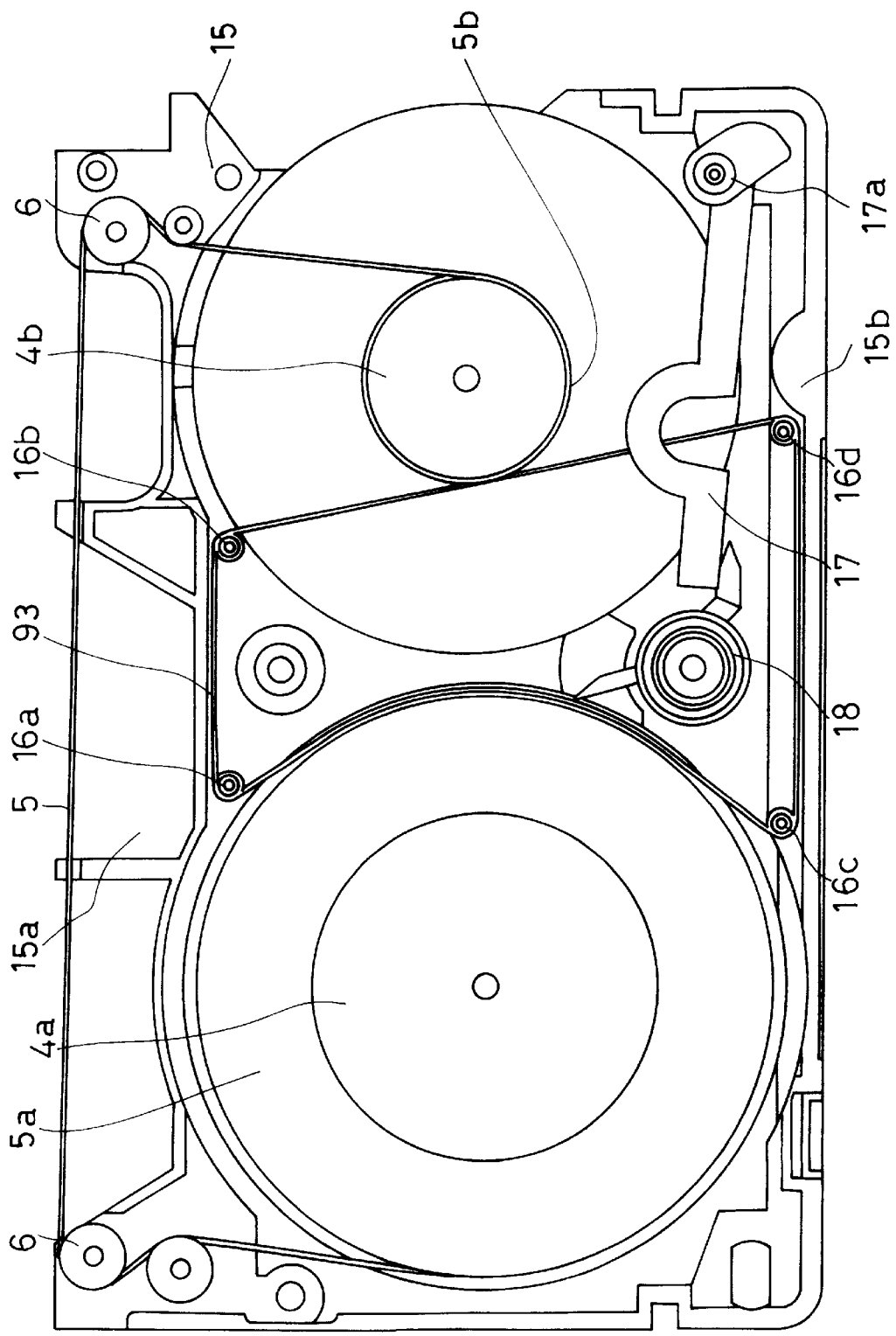
FIG. 9 is a plan view of the tape cartridge shown in FIG. 8.

A fourth embodiment of a tape cartridge of this invention is described referring to FIGS. 8 and 9. FIG. 8 is a perspective view of the tape cartridge from which the top cover was removed. FIG. 9 is a plan view of the tape cartridge. Elements designated by the same numerals in the above-mentioned first embodiment are substantially the same, and therefore explanation of them are omitted. The fourth embodiment corresponds to the tape cartridge having a reel lock mechanism. In FIG. 9, an upper flange of reel 4b positioned at right-hand in the figure was omitted so that the path of a belt 93 could easily be understood.

The tape cartridge shown in FIGS. 8 and 9 comprises the reel lock mechanism configured by a reel lock arm 17 which is rotatively pivoted by an axis 17a, reel lock member 18 disposed in the vicinity of the center on the rear side 15b of base member 15, and so on.

When the tape cartridge is loaded on a recording-reproducing apparatus (not shown in the figure), reel lock arm 17 is rotated, and it further rotates reel lock member 18 which was locked the rotation of the supplier reel 4a. When reel lock member 18 rotates, a hook (not shown in the figure) which was engaged with reel 4a is released, and the supplier reel 4a can freely be rotated.

In the fourth embodiment, the reel lock mechanism is disposed at a position where the belt guide roller 16c in the first embodiment was provided. Thus, belt 93 is guided by four belt guide rollers 16a, 16b, 16c and 16d which are respectively disposed toward the center on the front side 15a and rear side 15b of base member 15. For avoiding the spatial interference with belt 93, a part of reel lock arm 17, which is closer to base member 15, is cut.

As shown in FIGS. 8 and 9, four belt guide rollers 16a, 16b, 16c and 16d are disposed in a manner so that belt 93 comes into contact the core of reel 4a or 4b to which tape 5 is hardly wound under the initial condition that almost of tape 5 is wound around one reel 4b or 4a and tape 5 is hardly wound around the other reel 4a or 4b. By such a configuration, the winding angle of tape 93 can be minimized, and the tension to draw the tape 5 can be made much smaller.

Fifth Embodiment

Figure 10:
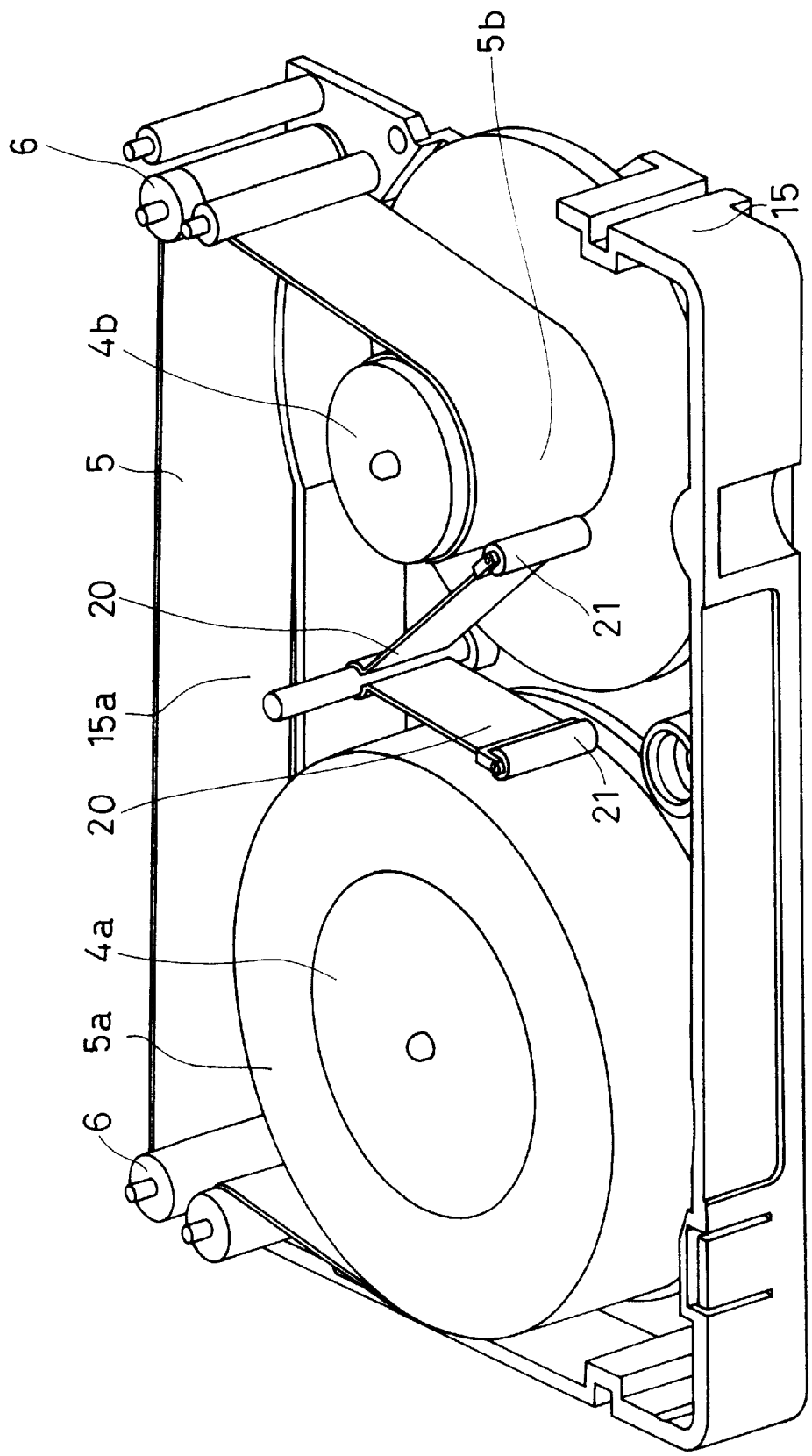
FIG. 10 is a perspective view showing a detailed configuration of a tape cartridge of a fifth embodiment of this invention.
Figure 11:
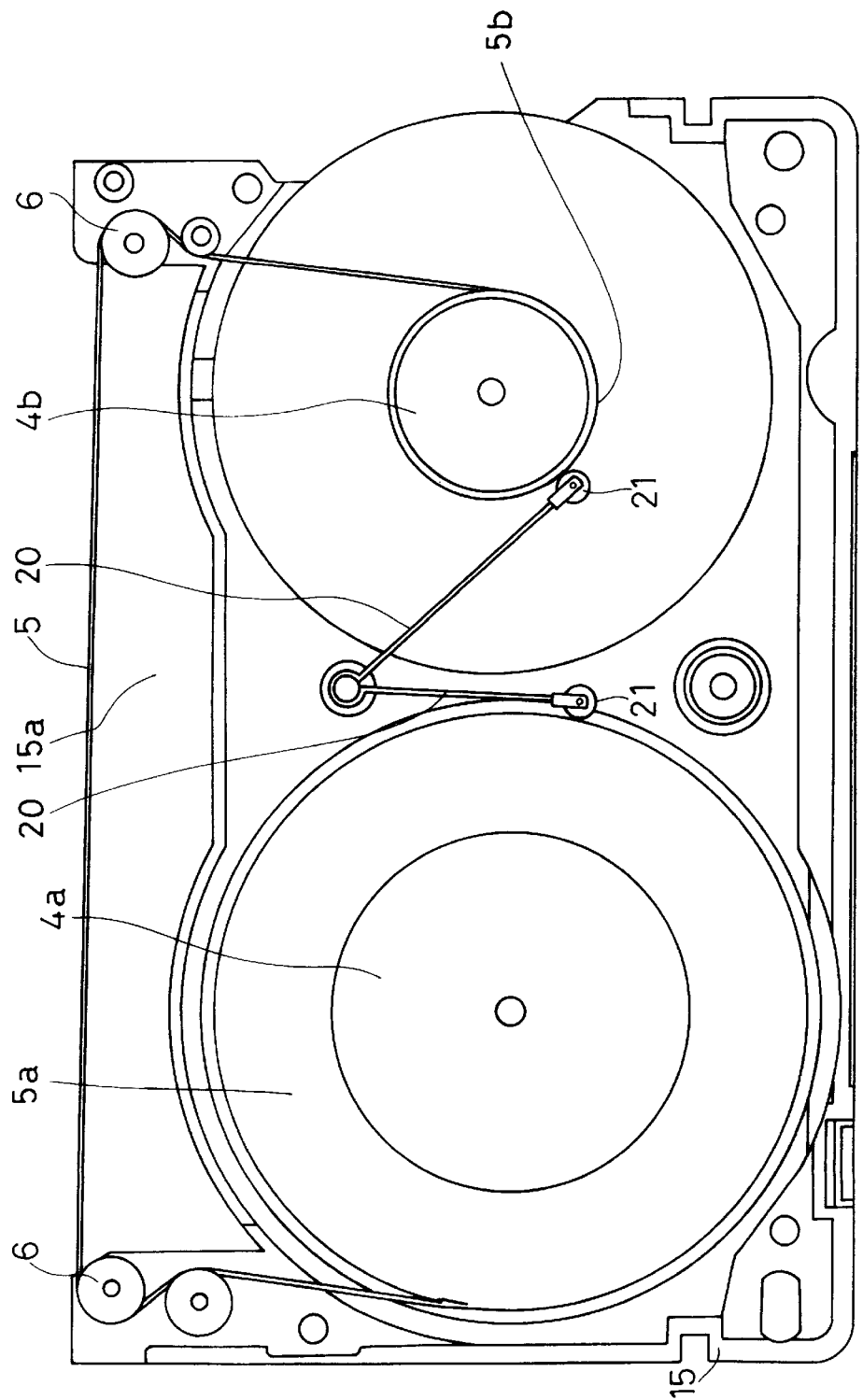
FIG. 11 is a plan view of the tape cartridge shown in FIG. 10.

A fifth embodiment of a tape cartridge of this invention is described referring to FIGS. 10 and 11. FIG. 10 is a perspective view of the tape cartridge from which the top cover was removed. FIG. 11 is a plan view of the tape cartridge. Elements designated by the same numerals in the above-mentioned first embodiment are substantially the same, and therefore explanation of them are omitted. In the fifth embodiment, pressing rollers 21 which are respectively rotatively pivoted at end parts of two touching arms 20 having elasticity, instead of the belt used in the above-mentioned first to fourth embodiments.

In the tape cartridge shown in FIGS. 10 and 11, touching arms 20 are rotatively pivoted by an axis 20a which is disposed substantially the center on the front side 15a of base member 15. Touching arms 20 rotates responding to the changes of the diameter of parts 5a, 5b of tape 5 respectively wound around reels 4a, 4b while tape 5 is wound from one reel 4a or 4b to the other reel 4b or 4a. Pressing rollers 21, which can rotate by following the movement of tape 5, are respectively provided at the end parts of touching arms 20. Since pressing rollers 21 are rotative, pressing rollers 21 will not damage the surface of tape 5 during the tape moving, and the friction of the tape moving can be reduced.

When pressing rollers 21 are made of a material having adhesion, not only can the air between the tape layers wound around reels 4a, 4b be removed, but also the dust adhered on the surface of tape 5 can be removed while pressing rollers 21 roll on the surface of tape 5. As a result, the occasion of drop-out or the rate of error can be reduced drastically.

With respect to the pressure of pressing rollers 21 for pressing tape 5 by the elasticity of touching arms 20, it is necessary that pressing rollers may not depart from the surface of tape 5 during the tape moving. If the pressure of pressing rollers 21 is much larger than a predetermined value, pressing rollers will damage the surface of tape 5 or the friction of the tape moving will become larger. In the fifth embodiment, the pressure of pressing rollers 21 is preferably smaller than 1 N, and more preferably smaller than 0.2 N. For preventing scratching of the surface of tape 5 by pressing rollers 21, it is preferable that the edges of pressing rollers 21 are circularly chamfered. Alternatively, it is preferable that crowning is performed to pressing rollers 21. Furthermore, for preventing the loosening of tape 5 wound around reels 4a and 4b, it is preferable that pressing rollers 21 have rotation friction. Furthermore, it is preferable that the tolerance of pressing rollers 21 in a direction parallel to the tape moving direction is smaller than 0.5 mm. Thereby, the roller can freely be moved against the tape, so that the load for moving or drawing the tape can be reduced. Furthermore, it is preferable that lubricant is impregnated with pressing rollers 21. Thereby, the lubricant can be transmitted to the surface of tape 5, so that the still-life of tape 5 can be drastically increased without reducing the film strength of tape 5.

COMPARISON EXAMPLE

Figure 12:
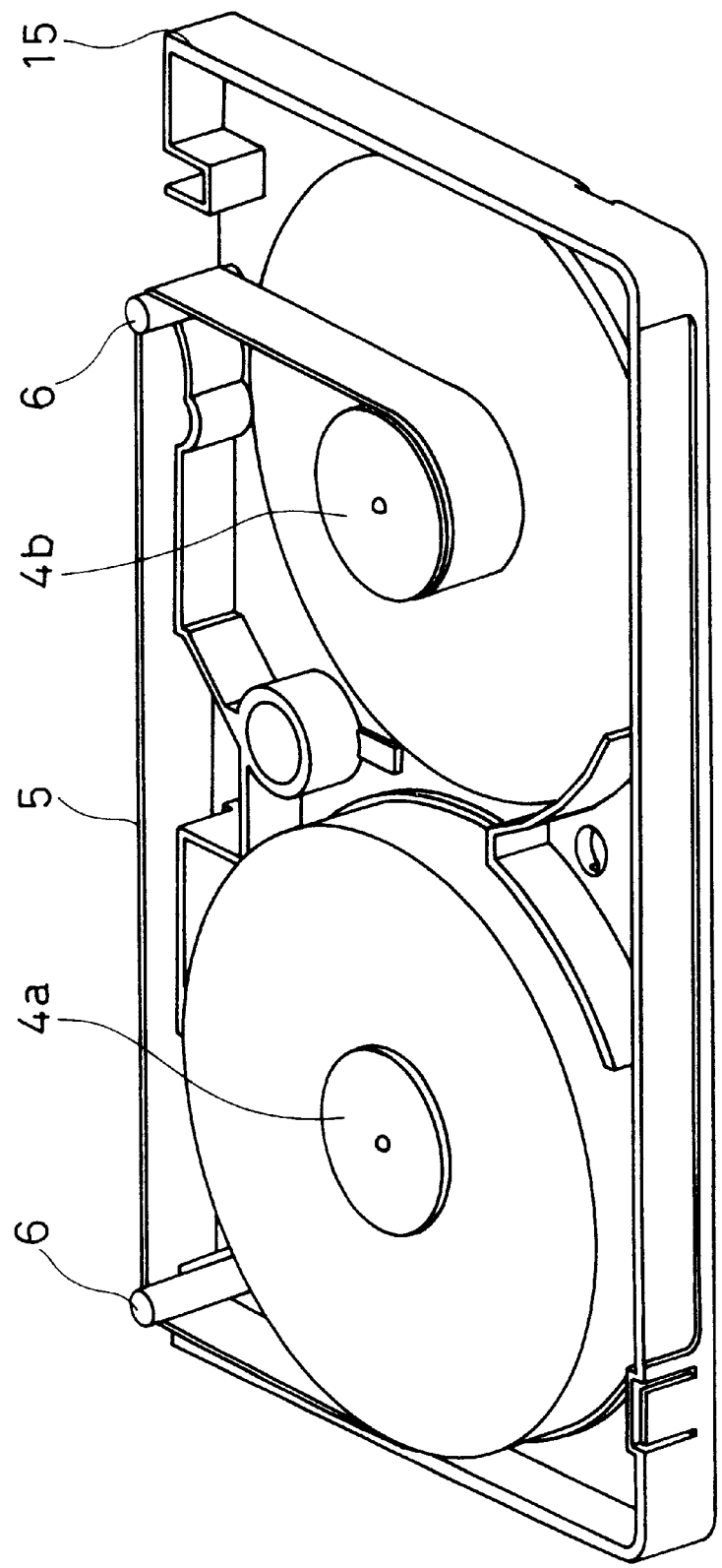
FIG. 12 is a perspective view showing a detailed configuration of a comparative conventional tape cartridge which is made to be compared with the tape cartridges of this invention for confirming the effects of this invention.
Figure 13:
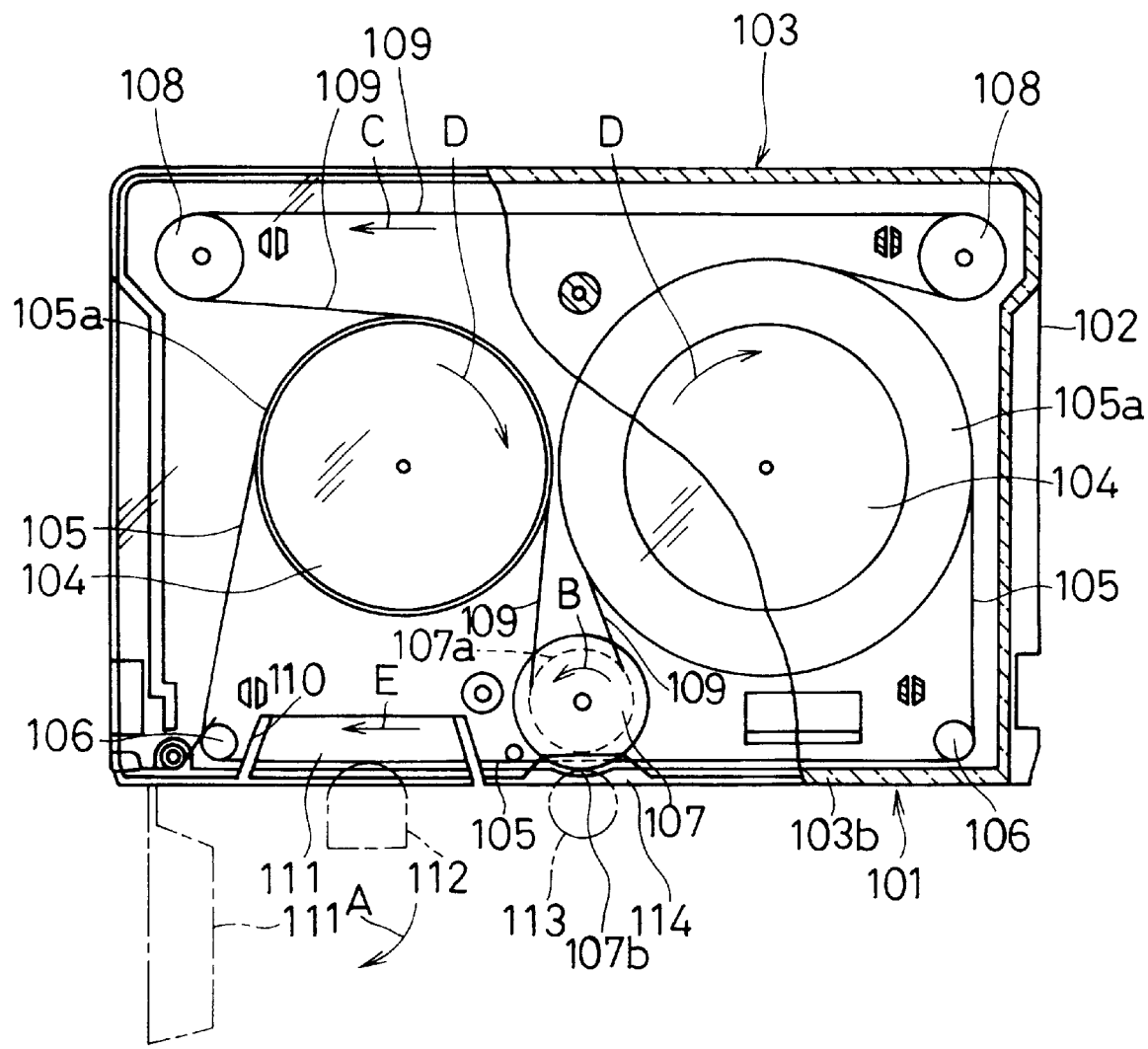
FIG. 13 is the plan view showing the configuration of a conventional tape cartridge.
Figure 14:
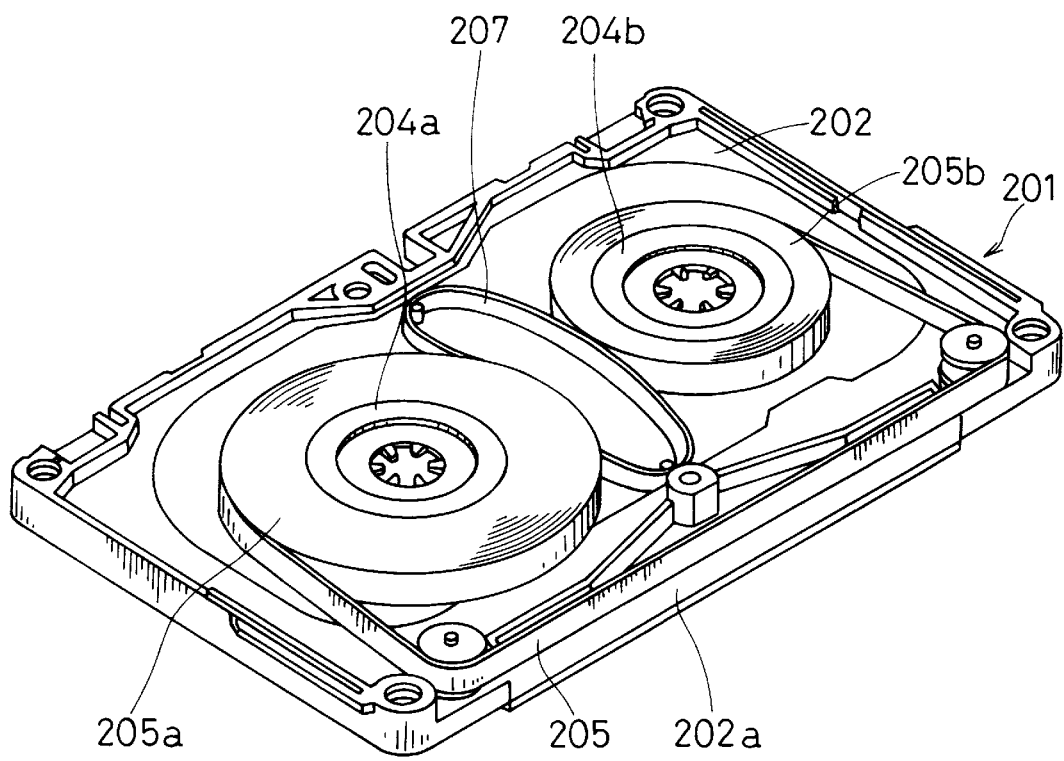
FIG. 14 is a perspective view showing the configuration of another conventional tape cartridge.
Figure 15:
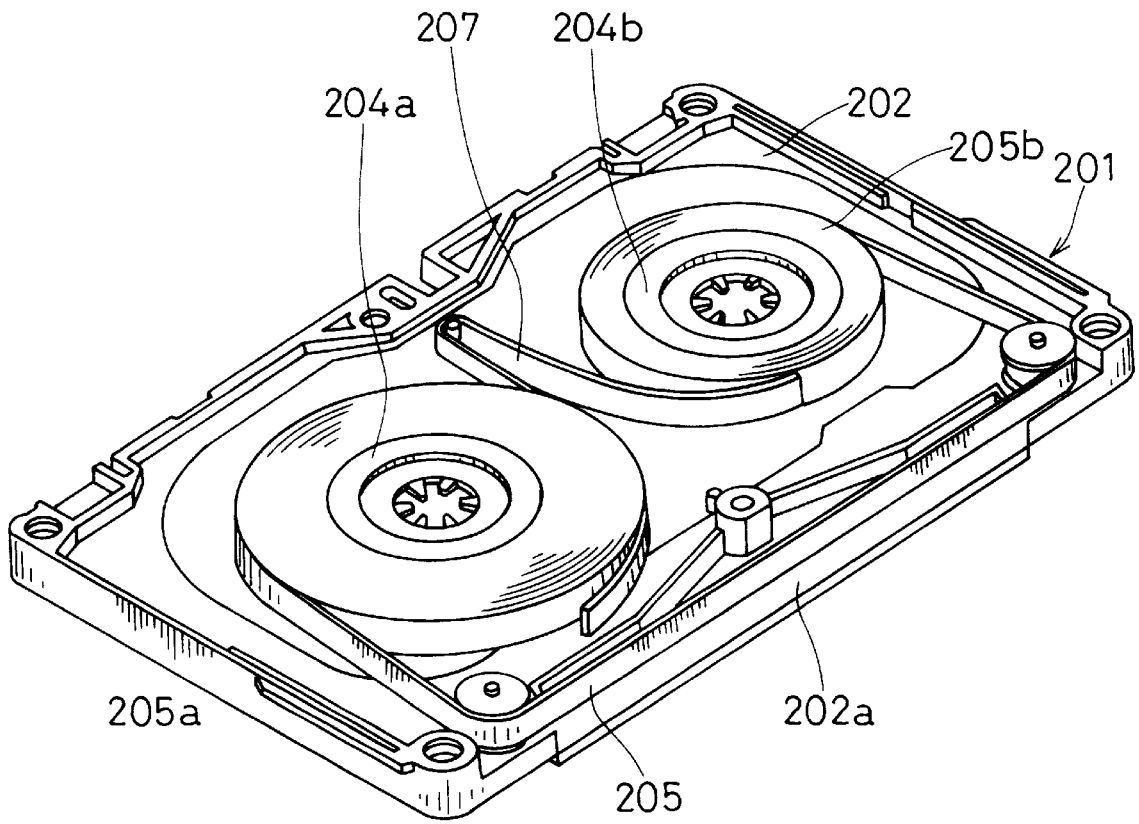
FIG. 15 is a perspective view showing another configuration of the conventional tape cartridge shown in FIG. 14.

For confirming the effects of this invention, a conventional tape cartridge without the pressing member (belt or pressing roller) was produced. The details of the tape cartridge of this example is shown in FIG. 12. The tape cartridge is substantially the same as that of the third embodiment except the use of pressing member such as belt. Quick forwarding and rewinding operations of the tape were repeated by using the tape cartridges corresponding to the first to fifth embodiments and the comparison example. The results of experiments are shown in Table 1. In Table 1, "Appearance" means the appearance of the tape wound around the reel when the quick forwarding and rewinding operations were repeated one hundred times. "○" designates a very good condition. "Δ" designates a good condition. "x" designates poor appearance. Furthermore, "Drop-out increase" means an increased ratio of the occurrence of drop-out after repeating quick forwarding and rewinding operations one hundred times in comparison with the occurrence of drop-out in the initial condition.

TABLE 1

|  | Appearance | Drop-out increase |
| --- | --- | --- |
| First embodiment | ○ | 1.01 |
| Second embodiment | ○ | 0.91 |
| Third embodiment | ○ | 1.03 |
| Fourth embodiment | ○ | 1.02 |
| Fifth embodiment | ○ | 1.00 |
| Reference example | X | 127.52 |

From the above-mentioned Table 1, it is observed that a very good appearance and remarkable restriction in the occurrence of drop-out can be achieved by the tape cartridges of this invention.

In the above-mentioned embodiments, straight rollers having a diameter that is even in every part are used as tape guides 6. However, crowning can performed on the rollers for tape guides 6, so that the moving passage of tape can be made more stable. Alternatively, it is acceptable that the rollers for tape guides 6 have guards at both ends. Thereby, the movement of tape 5 can be made more smooth and stable, and the up and down vibration in the widthwise direction perpendicular to the tape moving direction can be restricted. Alternatively, even when tape guides 6 are not rotative, it is possible to obtain substantially the same effect as that of the above-mentioned embodiment by finishing the surface of tape guides 6 smoothly. Furthermore, it is acceptable that belt guide rollers 16a, 16b and 16c have guides at both ends. Alternatively, it is acceptable that the belt guide are not rotative when the surfaces of the belt guides are finished smooth, or when a material having the smoothness to the material of belt 9 is used as the belt guides.

In the above-mentioned first to fourth embodiments, as a material of belt 9, 91, 92, 93, the knit fabric of fibers having large expandability and contractibility is used. However, when a material selected from woven fabrics of polyester, nylon, polyurethane, rayon and polyfluorocarbon, elastic non-woven fabrics, or a resin sheet with a suitable surface treatment and film is used as belt 9, substantially the same effect as that of the above-mentioned embodiment can be obtained.

Furthermore, a material having smaller expandability and contractibility can be used as the belt with tension adjusting roller contacting a part of the belt. Since the tension adjusting roller maintains the tension of the belt at constant, an effect substantially the same as that of the above-mentioned embodiments can be obtained.

Furthermore, when both ends of the belt which has smaller expandability and contractibility are fixed similar to the second embodiment, it is preferable that at least one end of the belt is fixed via an elastic member such as a spring. Thereby, substantially the same effect as that of the second embodiment can be obtained. By using a material having the ability to capture dust as the belt, the recording face of the tape can be cleaned. Actually, when the belt moves, the belt slightly slips on the surface of the tape, so that the dust adhered on the surface of the tape can be captured. As a result, the occurrence of drop-out or an increase in the rate of error can be prevented.

The tape cartridge of this invention can be applied, for example, to the cartridges of the rotary-head-type video taperecorder such as VHS, VHS-C, 8 mm Video, Beta, DAT (Digital Audio Taperecorder), DDS. Furthermore, by applying the cartridge such as QIC, the tape cartridge can be used in the rotary-head-type recording and reproducing apparatus. Furthermore, this invention can be applied to the tape cartridge for the taperecorder that does not use the rotary-head such as a compact cassette of Phillips-type, DCC (Digital Compact Cassette). Furthermore, the tape is not restricted to magnetic tape. This invention can be applied to all type of double reels type tape cartridge for film, roll paper photomagnetic tape, photo-recording tape, flexible sheet, and so on.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A tape cartridge for a rotary-head-type tape recording and reproducing apparatus, comprising:

a pair of reels rotatively pivoted on a base member, the base member having a front edge and a rear edge;

a tape wound between the reels, the tape being capable of being drawn out from the front edge of the base member;

tape guide members provided in the base member for guiding movement of the tape from one reel to the front edge of the base member and then to the other reel;

a belt contacting outer surfaces of parts of the tape wound around the reels, wherein the belt has smoothness that enables slippage between the belt and the tape when the tape is drawn out from the tape cartridge, and further the belt has elasticity, expandability and contractability for responding to change in diameter of the parts of the tape as the tape is wound around the reels; and a plurality of belt guide members on the base member providing means for pressing the belt against the outer surfaces of the tape, the belt eliminating air between each successive tape layer on the reels.

2. The tape cartridge of claim 1, wherein said belt has a closed-loop-shape, and wherein at least one of said belt guide members is provided at a position in the vicinity of the center on the front side of said base member and at least two of said belt guide members are respectively provided at positions in the vicinity of both ends on a rear side of said base member.

3. The tape cartridge in accordance with claim 1, wherein said belt has a closed-loop-shape, and least two pairs of said belt guide members are respectively provided on a front side and a rear side of a space formed between said reels on said base member.

4. The tape cartridge of claim 1, wherein said belt has a ribbon-shape, and wherein at least one of said belt guide members is provided at a position in the vicinity of the center on the front side of said base member, and two of said belt guide members, to which both ends of said belt are connected, are respectively provided at positions in the vicinity of both ends on a rear side of said base member.

5. The tape cartridge in accordance with claim 1, 2 or 4, wherein at least one of said belt guide members is a roller rotatively pivoted.

6. The tape cartridge in accordance with claim 5, wherein crowning is performed to make the diameter at the center of said roller larger than at both ends of said roller.

7. The tape cartridge in accordance with claim 5, wherein said roller has guards at both ends.

8. The tape cartridge in accordance with claim 5, wherein said roller in a widthwise direction, perpendicular to the tape moving direction, has a tolerance smaller than 0.5 mm.

9. The tape cartridge in accordance with claim 1, 2 or 4, wherein at least one of said belt guide members is a non-rotative axis fixed on said base member.

10. The tape cartridge in accordance with claim 1, 2, 3 or 4, wherein an incident angle and an exit angle of said belt to a core of said reel, to which said tape is not wound, are substantially the same as the tangential line thereto.

11. The tape cartridge in accordance with claim 3, wherein a reel lock mechanism, which is rotatively pivoted on said base member and does not spatially interfere with said belt is provided on said base member.

12. The tape cartridge in accordance with claim 1, wherein each of said tape guide members is a roller rotatively pivoted on said base member.

13. The tape cartridge in accordance with claim 12, wherein crowning is performed to make the diameter at the center larger than at both ends of said roller.

14. The tape cartridge in accordance with claim 12, wherein said roller has guards at both ends.

15. The tape cartridge in accordance with claim 12, wherein said roller in a widthwise-direction, perpendicular to the tape moving direction, has a tolerance smaller than 0.5 mm.

16. The tape cartridge in accordance with claim 1, wherein each of said tape guide members is a non-rotative axis fixed on said base member.

17. The tape cartridge in accordance with claim 1, 2 or 4, wherein said tape is made of at least one material selected from a group consisting of a woven fabric, a knit fabric, and a non-woven fabric.

18. The tape cartridge in accordance with claim 1, 2 or 4, wherein lubricant is impregnated in said belt.

19. The tape cartridge in accordance with claim 1, 2 or 4, wherein the friction coefficient between said belt and said tape is smaller than 0.7.

20. The tape cartridge in accordance with claim 1, 2 or 4, wherein said belt has a tension smaller than 3 N.

21. The tape cartridge in accordance with claim 17, wherein side edges of said tape are heat melted.

22. The tape cartridge in accordance with claim 17, wherein resin is coated on a surface of said belt.

* * * * *